June 25, 1957 N. M. HARVENDER 2,796,635
METHOD OF MOLDING ELECTRIC CONTACT RINGS
Filed May 18, 1954
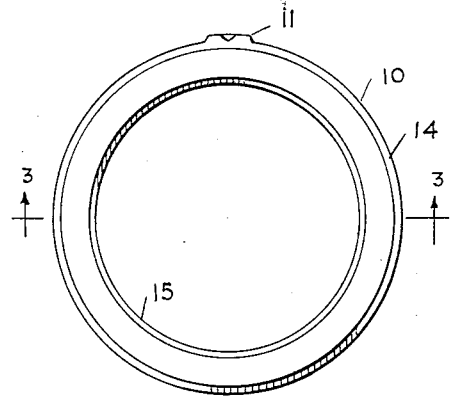
FIG. 1.
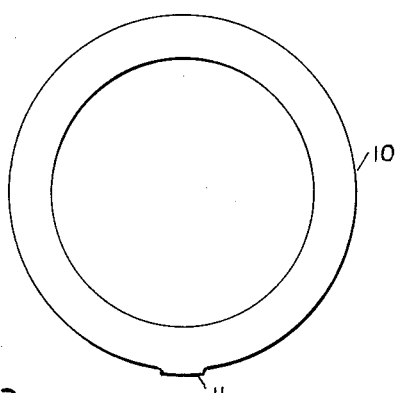
FIG. 2.
FIG. 3.
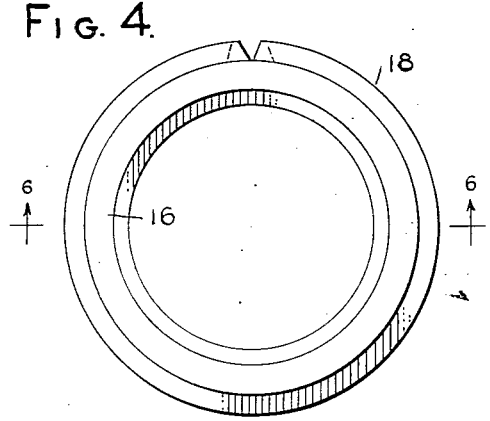
FIG. 4.
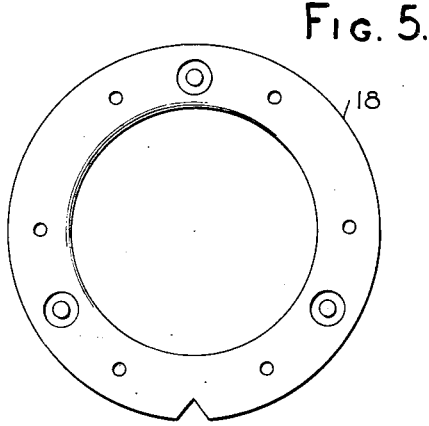
FIG. 5.
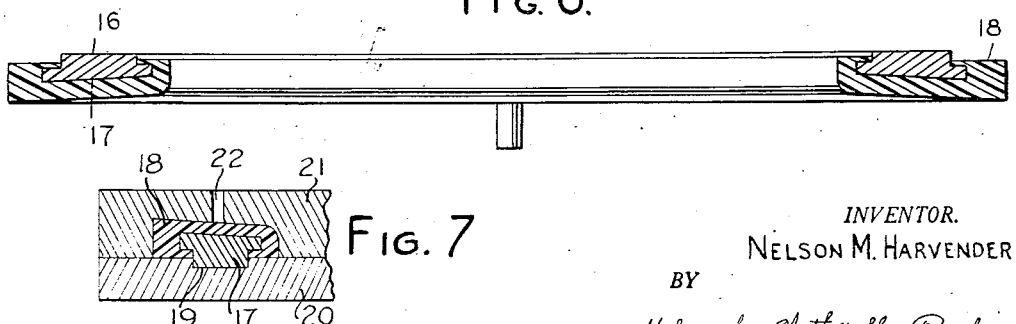
FIG. 6.
FIG. 7.
*INVENTOR.*
NELSON M. HARVENDER
BY
Holcombe Wetherill & Brisebois
*ATTORNEYS*

United States Patent Office 2,796,635
Patented June 25, 1957

2,796,635
METHOD OF MOLDING ELECTRIC CONTACT RINGS

Nelson M. Harvender, Stamford, Conn., assignor, by mesne assignments, to Breeze Corporations, Inc., Union, N. J., a corporation of New Jersey Application May 18, 1954, Serial No. 430,600

1 Claim. (Cl. 18—59)

This invention relates to the plastic molding art, more in particular, to the molding of a combination metal and plastic article.

Heretofore, in the molding of a plastic about a metal insert by either the injection or transfer molding process, there has been a certain amount of distortion of the metal due to the strains set up in the molding process caused by the differences in the thermal expansion rates of the plastic and the metal. If it was desired that the metal insert be in the form of a ring and have a planar surface, it was found to be necessary to either machine or grind the article after molding in order to obtain the desired surface.

It is an object of the present invention to obtain by a simple molding step a combination metal and plastic article wherein the metal article presents the desired surface characteristic without a machining step after molding.

It has been found that the molding strains caused deformation of a metal insert when a combination metal and plastic article was made in order to be able to mold a metal part in combination with plastic of either the thermosetting or thermo-plastic type and that it was necessary to compensate for the deformity of the metal part by a change in configuration of the metal insert before molding.

One embodiment of this invention is illustrated in the accompanying drawing wherein:

Fig. 1 is a plan view of the upper surface of a metal ring;

Fig. 2 is a plan view of the lower surface of a metal ring;

Fig. 3 is a section on line 3—3 of Fig. 1;

Fig. 4 is a plan view of the upper surface of the molded article;

Fig. 5 is a plan view of the lower surface of the molded article; and

Fig. 6 is a section on line 6—6 of Fig. 4.

Fig. 7 is a cross sectional view showing the article in the mold.

Referring more specifically to the drawing, a metal insert to be molded in a plastic article wherein it is desired that the metal insert have a planar upper surface, is shown in Fig. 1, wherein 10 is a metal ring having a connector projection 11. The upper surface of this ring shown in Fig. 3 is sloped toward the center of the ring so that the inner edge 12 is thinner than the outer edge 13. It has the outer lip 14 and the inner lip 15. This sloping upper surface 16 is not parallel to the planar lower surface 17 as shown in Fig. 3. The lips 14 and 15 are continuous as shown in Fig. 1.

A plastic backing 18 is molded (as shown in Figs. 4 and 5) about this ring by either the injection molding process or the transfer molding process using a plastic of either the thermo setting or the thermo plastic type. This plastic is manipulated at a temperature substantially above room temperature depending on the type of plastic. The metal insert 17 is placed in the mold 20, 21, shown in Fig. 7 so that the exposed surface of the ring is received within the recess in the lower half of the mold 20. The upper half of the mold 21 is then brought into position and the plastic backing 18 is then admitted under the proper temperature and pressure through the gate 22, as shown in Fig. 7. This ring when removed from the mold takes the shape shown in Fig. 6. The article is removed from the mold and cooled to room temperature. Certain well known strains are set up in the article due to the differences in contraction between the metal and the plastic. These strains will deform the finished article in a manner capable of being determined and it has been found if a ring type article, such as is here illustrated is being formed, that the metal will be deformed in such a manner that the smaller circumference will be forced toward the exposed metal surface and the outer circumference forced away from the exposed metal surface. This is shown in Figs. 4, 5 and 6, as resulting in a surface 16 being a planar surface while the opposed surface 17 is now sloping towards the center of the ring. This method of molding by compensating for a distortion by starting with a metal insert that is so prepared that the surfaces will be those desired after distortion, has heretofore not been known.

The particular application of the broad general invention described above applies to contact rings for conveying current from a moving part to a stationary part.

It also can apply to clutch plates or any device where it is desired to mold the plastic about a flat metal insert exposing one surface of the metal and have this surface a planar surface. The electrical contact ring so formed must have a planar surface to give satisfactory contacts with the brush and heretofore it has been necessary to machine these parts in order to obtain the desired surface feature.

While in the above example metal plates have been used as an illustration, it is realized that one skilled in the art can use this invention to form any plastic body containing a metal insert as the strain set up due to the cooling and the different expansion will produce distortion in the finished article.

What is claimed is:

A process for producing a flat metal annulus having rigidly attached thereto a plastic backing on one side of said annulus which comprises forming a metal annulus, the upper side of which has a raised portion narrower than the lower side, the upper surface of the raised portion sloping towards the center of the annulus with relation to the lower portion, inserting said metal annulus in a mold with the raised portion partially seated in a recess in the mold and flowing plastic under heat and pressure around the metal insert to form a plastic backing which covers the lower surface and distorts the annulus so that the exposed raised surface is a planar surface.

References Cited in the file of this patent

UNITED STATES PATENTS

| 1,186,693 | Siggins | June 13, 1916 |
|---|---|---|
| 1,241,559 | Scheibe | Oct. 2, 1917 |
| 1,763,653 | Harvey | June 17, 1930 |
| 1,907,303 | Peterson | May 2, 1933 |
| 2,307,874 | Bilde | Jan. 12, 1943 |